United States Patent
Yokoyama et al.

(10) Patent No.: US 11,901,593 B2
(45) Date of Patent: Feb. 13, 2024

(54) AIR BATTERY AND METHOD FOR USING THE SAME

(71) Applicant: Panasonic Intellectual Property Management Co., Ltd., Osaka (JP)

(72) Inventors: Masako Yokoyama, Osaka (JP); Masahisa Fujimoto, Osaka (JP); Mitsuhiro Hibino, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 183 days.

(21) Appl. No.: 17/378,769

(22) Filed: Jul. 19, 2021

(65) Prior Publication Data
US 2021/0344065 A1 Nov. 4, 2021

Related U.S. Application Data

(63) Continuation of application No. PCT/JP2020/006739, filed on Feb. 20, 2020.

(30) Foreign Application Priority Data

May 30, 2019 (JP) ................. 2019-101768

(51) Int. Cl.
*H01M 12/02* (2006.01)
*H01M 12/06* (2006.01)
(Continued)

(52) U.S. Cl.
CPC ........... *H01M 8/043* (2016.02); *H01M 10/44* (2013.01); *H01M 12/08* (2013.01); *H01M 50/609* (2021.01); *H01M 50/691* (2021.01)

(58) Field of Classification Search
CPC ...... H01M 12/02; H01M 12/06; H01M 12/08; Y02E 60/10
See application file for complete search history.

(56) References Cited

U.S. PATENT DOCUMENTS

| 8,795,868 B1 * | 8/2014 | Miles ................. H01M 10/052 429/344 |
| 9,466,857 B1 * | 10/2016 | Cheng ............... H01M 10/0569 |
| 2006/0269834 A1 * | 11/2006 | West ................... H01M 4/1393 429/105 |

(Continued)

FOREIGN PATENT DOCUMENTS

| CN | 105609898 A | * | 5/2016 | ........... H01M 12/06 |
| CN | 205335398 U | * | 6/2016 | ........... H01M 12/06 |

(Continued)

OTHER PUBLICATIONS

International Search Report of PCT application No. PCT/JP2020/006739 dated May 19, 2020.

(Continued)

*Primary Examiner* — Kaity V Chandler
(74) *Attorney, Agent, or Firm* — Rimon, P.C.

(57) ABSTRACT

A charge/discharge method of an air battery is a charge/discharge method of an air battery including a positive electrode, a negative electrode, and a nonaqueous electrolyte liquid containing a nonaqueous solvent and a lithium salt dissolved in the nonaqueous solvent, the nonaqueous electrolyte liquid being interposed between the positive electrode and the negative electrode, the charge/discharge method includes: discharging the air battery; and supplying a charging liquid different from the nonaqueous electrolyte liquid from the outside to the inside of the air battery so that a discharge product generated by the discharging is desorbed from the positive electrode while being in the form of a solid.

10 Claims, 3 Drawing Sheets

(51) Int. Cl.
*H01M 8/043* (2016.01)
*H01M 12/08* (2006.01)
*H01M 50/691* (2021.01)
*H01M 50/609* (2021.01)
*H01M 10/44* (2006.01)

(56) References Cited

U.S. PATENT DOCUMENTS

| | | | |
|---|---|---|---|
| 2016/0261013 A1 | 9/2016 | Hase et al. | |
| 2017/0365855 A1* | 12/2017 | Ryu | H01M 10/052 |
| 2019/0097291 A1* | 3/2019 | Moriishi | H01M 10/0568 |
| 2020/0185776 A1* | 6/2020 | Xu | H01M 4/62 |
| 2020/0303747 A1* | 9/2020 | Rhee | H01M 4/8647 |
| 2021/0083310 A1* | 3/2021 | Perry | H01M 8/0488 |

FOREIGN PATENT DOCUMENTS

| | | | | |
|---|---|---|---|---|
| CN | 108511745 A | * | 9/2018 | H01M 12/06 |
| CN | 208548434 U | * | 2/2019 | H01M 12/06 |
| JP | 5387322 B2 | * | 1/2014 | Y02E 60/10 |
| JP | 2016-162686 | | 9/2016 | |
| JP | 2017147045 A | * | 8/2017 | Y02E 60/50 |
| JP | 2017-174771 | | 9/2017 | |

OTHER PUBLICATIONS

Yoko Hase et al., "A highly efficient Li2O2 oxidation system in Li—O2 batteries", Chem. Commun., 52, Aug. 12, 2016, 12151-12154.

* cited by examiner

AIR BATTERY AND METHOD FOR USING THE SAME

BACKGROUND

1. Technical Field

The present disclosure relates to an air battery and a method for using the same.

2. Description of the Related Art

An air battery is a battery in which oxygen in air is used as a positive electrode active material, and a metal or a compound capable of occluding and releasing metal ions is used as a negative electrode active material. The air battery has advantages such that the energy density is high, and the size and the weight thereof are likely to be reduced. Hence, the air battery has drawn attention as a battery having an energy density higher than that of a lithium ion battery which is believed to have the highest energy density at the moment.

In the air battery, a discharge product is precipitated by a discharge reaction, and the discharge product is decomposed by a charge reaction. Since the discharge product is not likely to be decomposed, the charge reaction is not likely to proceed. A problem of the air battery as a secondary battery is that charge/discharge cycle characteristics are not favorable. For example, in a lithium air battery using metal lithium as a negative electrode active material, lithium peroxide is precipitated by a discharge reaction. Since lithium peroxide has an inferior electron conductivity, a lithium air battery requires a very long time for charge.

Japanese Unexamined Patent Application Publication No. 2017-174771 discloses a mechanical charge type metal air battery having a supply port to supply a negative electrode active material from the outside.

Yoko Hase et al., A highly efficient $Li_2O_2$ oxidation system in Li—O2 batteries, Chem. Commun., 2016, 52, 12151-12154 (Non-Patent Document 1) proposes a method in which lithium peroxide is chemically decomposed by injecting as a charging liquid, an electrolyte liquid containing an oxide of a redox mediator from the outside of a battery.

Japanese Patent No. 6,233,335 discloses an air battery including a first positive electrode to perform a discharge reaction and a second positive electrode to oxidize a redox mediator. A charge operation is performed without a charge current flowing through the first positive electrode and without a liquid injection performed from the outside.

SUMMARY

One non-limiting and exemplary embodiment provides a technique to shorten a charge time of an air battery.

In one general aspect, the techniques disclosed here feature a charge/discharge method of an air battery including a positive electrode, a negative electrode, and a nonaqueous electrolyte liquid containing a nonaqueous solvent and a lithium salt dissolved in the nonaqueous solvent, the nonaqueous electrolyte liquid being interposed between the positive electrode and the negative electrode, the method comprising: discharging the air battery; and supplying a charging liquid different from the nonaqueous electrolyte liquid from the outside to the inside of the air battery so that a discharge product generated by the above discharging is desorbed from the positive electrode while being in the form of a solid.

According to the technique of the present disclosure, the charge time of the air battery can be shortened.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Underlying Knowledge Forming Basis of the Present Disclosure)

In a negative electrode mechanical charge type air battery, since a discharge reaction is stopped when an amount of a discharge product precipitated on a positive electrode reaches an upper limit, besides a supply of a negative electrode active material, a change of the positive electrode is also required.

A time required for charge using reactions of a redox mediator and lithium peroxide depends on reaction rates thereof and is approximately several hours at the shortest (for example, see FIG. 1 of Non-Patent Document 1). Hence, a charge time has been desired to be further shortened.

The present disclosure provides a technique to shorten the charge time of an air battery.

(Guideline of Aspects of the Present Disclosure)

A method for using an air battery according to a first aspect of the present disclosure is a charge/discharge method of an air battery including a positive electrode, a negative electrode, and a nonaqueous electrolyte liquid containing a nonaqueous solvent and a lithium salt dissolved in the nonaqueous solvent, the nonaqueous electrolyte liquid being interposed between the positive electrode and the negative electrode, the method comprising:

(1) discharging the air battery; and (2) supplying a charging liquid different from the nonaqueous electrolyte liquid from the outside to the inside of the air battery so that a discharge product generated by the discharging is desorbed from the positive electrode while being in the form of a solid.

According to the first aspect, since the discharge product is not required to be fully decomposed, compared to the case in which the charge is performed by electrochemically or chemically decomposing the discharge product, the charge can be completed in a significantly short time. Since no current is required to flow through the positive electrode, degradation of the positive electrode and production of by-products, such as lithium carbonate, are also suppressed.

In a second aspect of the present disclosure, for example, the method for using an air battery according to the first aspect may further comprise:

(3) emitting the electrolyte liquid from the inside to the outside of the air battery after the discharging (1) and before the supplying (2).

Accordingly, a space to fill the charging liquid can be secured, and in addition, the charging liquid can be surely brought into contact with the discharge product precipitated on the positive electrode.

In a third aspect of the present disclosure, for example, the method for using an air battery according to the first aspect may further comprise:

(4) emitting the electrolyte liquid from the inside to the outside of the air battery after the discharging (1) and in parallel with the supplying (2).

Accordingly, while the charging liquid is filled, since the electrolyte liquid is emitted to the outside of the air battery, a time for charge/discharge can be shortened.

In a fourth aspect of the present disclosure, for example, the method for using an air battery according to the first aspect may further comprise:

(5) emitting the discharge product desorbed from the positive electrode in the supplying (2) together with the charging liquid to the outside of the air battery. Accordingly, the discharge product is removed from the positive electrode, and a porous structure of the positive electrode is reproduced.

In a fifth aspect of the present disclosure, for example, the method for using an air battery according to the fourth aspect may further comprise:

supplying an electrolyte liquid to the inside of the air battery after the emitting (5). Accordingly, the charge of the lithium air battery is completed, and the lithium air battery can be again discharged.

According to a sixth aspect of the present disclosure, for example, in the method for using an air battery according to the fifth aspect, the method for using an air battery may further comprise:

(3) emitting the electrolyte liquid from the inside to the outside of the air battery after the discharging (1) and before the supplying (2), wherein the electrolyte liquid supplied after the emitting (5) may be the electrolyte liquid emitted in the emitting (3). Accordingly, the same electrolyte liquid can be reused.

According to a seventh aspect of the present disclosure, for example, in the method for using an air battery according to the fifth aspect, the method for using an air battery may further comprise:

(4) emitting the electrolyte liquid from the inside to the outside of the air battery after the discharging (1) and in parallel with the supplying (2), wherein the electrolyte liquid supplied after the emitting (5) may be the electrolyte liquid emitted in the emitting (4). Accordingly, the same electrolyte liquid can be reused.

According to a eighth aspect of the present disclosure, for example, in the method for using an air battery according to any one of the first aspect to the sixth aspect, the charging liquid may contain at least one selected from the group consisting of a compound represented by the following formula (1), a compound represented by the following formula (2), and a compound represented by the following formula (3). According to the charging liquid containing the at least one of those compounds, the discharge product precipitated on the positive electrode can be rapidly desorbed from the positive electrode. That is, the air battery can be charged in a short time.

In the formula (1), the formula (2), and the formula (3), $R_1$, $R_2$, and $R_3$ each independently represent a fluorinated alkyl group having 1 to 5 carbon atoms.

According to an ninth aspect of the present disclosure, for example, in the method for using an air battery according to the eighth aspect, as the at least one selected from the group consisting of the compound represented by the formula (1), the compound represented by the formula (2), and the compound represented by the formula (3), the charging liquid may contain at least one selected from the group consisting of tris(2,2,2-trifluoroethyl)phosphite, tris(2,2,2-trifluoroethyl)phosphate, tris(1,1,1,3,3,3-hexafluoro-2-propyl)phosphite, tris(2,2,2-trifluoroethyl)borate, and tris(hexafluoroisopropyl)borate. According to the compounds described above, the air battery can be charged in a shorter time.

In this specification, a time required for charge and a time consumed for charge are each referred to as "charge time".

Hereinafter, embodiments of the present disclosure will be described with reference to the drawings. The present disclosure is not limited to the following embodiments.

Embodiments

Figure 1:
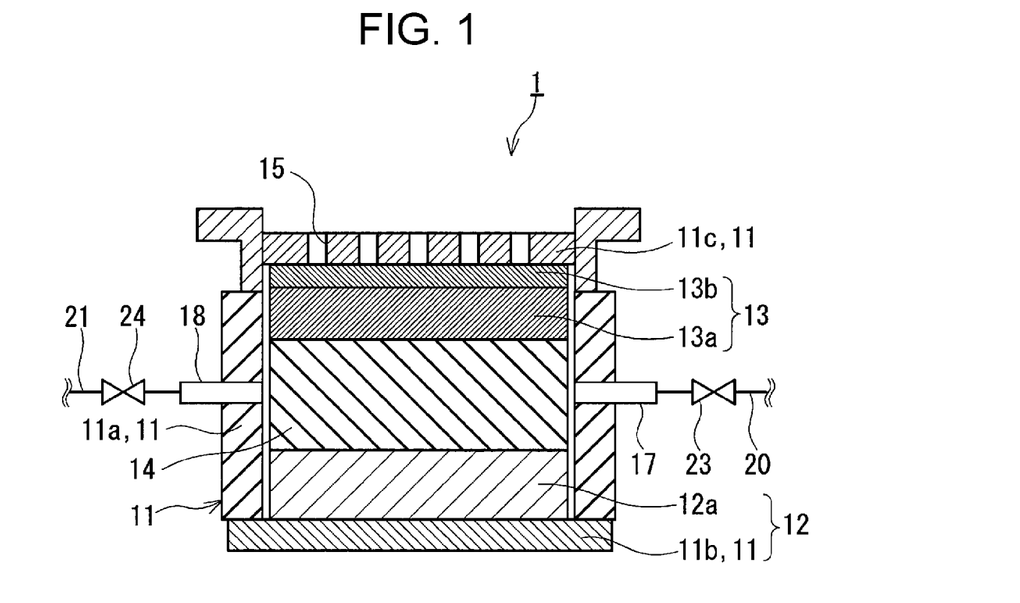
FIG. 1 is a cross-sectional view showing the structure of an air battery of the present disclosure.

FIG. 1 is a schematic cross-sectional view of a lithium air battery according to one embodiment of the present disclosure. As shown in FIG. 1, a lithium air battery 1 of this embodiment includes a battery case 11, a negative electrode 12, a positive electrode 13, and an electrolyte layer 14 functioning as a nonaqueous lithium ion conductor. The battery case 11 has a cylindrical portion 11a in which a top surface side and a bottom surface side are both opened, a bottom portion 11b provided so as to close the bottom surface side opening of the cylindrical portion 11a, and a lid portion 11c provided so as to close the top surface side opening of the cylindrical portion 11a. In the lid portion 11c, air inlet holes 15 through which air is introduced into the battery case 11 are provided. The negative electrode 12 has a negative electrode layer 12a disposed on an inner bottom surface of the bottom portion 11b of the battery case 11. The bottom portion 11b of the battery case 11 also functions as a negative electrode collector of the negative electrode 12. That is, by the bottom portion 11b also functioning as the negative electrode collector and the negative electrode layer 12a, the negative electrode 12 is formed. The positive electrode 13 is formed of a positive electrode layer 13a containing a carbon material and a positive electrode collector 13b disposed between the positive electrode layer 13a and the lid portion 11c of the battery case 11.

The electrolyte layer 14 of the lithium air battery 1 may contain a separator. Besides the bottom portion 11b, another negative electrode collector may also be provided. The lithium air battery 1 may further include a solid electrolyte contained in the electrolyte layer 14. The lithium air battery 1 may further include a negative electrode protective film contained in the electrolyte layer 14 or the negative electrode layer 12a. The lithium air battery 1 may further include an oxygen permeable film disposed at an upper part of the lid portion 11c of the battery case 11 or between the lid portion 11c and the positive electrode collector 13b.

In the battery case 11, an opening portion 17 (first opening portion) is provided. The opening portion 17 is provided in the cylindrical portion 11a in which the electrolyte layer 14 is received. The opening portion 17 is a supply port to supply a liquid from the outside to the inside of the battery case 11. The liquid to be supplied in the battery case 11 through the opening portion 17 can be an electrolyte liquid and a charging liquid. The charging liquid is a treatment liquid to desorb a discharge product from the positive electrode 13. The lithium air battery 1 can be charged by filling the charging liquid in the battery case 11 through the opening portion 17. The structure as described above is able to shorten the charge time. In the lithium air battery 1, the discharge product is lithium peroxide precipitated on the positive electrode 13.

To the opening portion 17, a first path 20 is coupled. The first path 20 is provided with a first valve 23. The first path 20 is a flow path to supply the electrolyte liquid and the charging liquid into the battery case 11. The first path 20 is formed of at least one pipe. By the first valve 23, the electrolyte liquid or the charging liquid can be sealed in the battery case 11. The first valve 23 may be a check valve or an on/off valve.

In the battery case 11, an opening portion 18 (second opening portion) is further provided. The opening portion 18 is provided in the cylindrical portion 11a in which the electrolyte layer 14 is received. The opening portion 18 is an emission port to emit a liquid from the inside to the outside of the battery case 11. The liquid to be emitted from the inside to the outside of the battery case 11 through the opening portion 18 can be the electrolyte liquid and a used charging liquid.

To the opening portion 18, a second path 21 is coupled. The second path 21 is provided with a second valve 24. The second path 21 is a flow path to emit the electrolyte liquid and the charging liquid from the inside to the outside of the battery case 11. The second path 21 is formed of at least one pipe. The second valve 24 functions to seal the electrolyte liquid or the charging liquid in the battery case 11 of the lithium air battery 1. The second valve 24 is, for example, an on/off valve.

By using the opening portion 17 and the opening portion 18, the electrolyte liquid and the charging liquid can be filled and sealed in the battery case 11, and in addition, the electrolyte liquid and the charging liquid can be emitted from the battery case 11. The electrolyte liquid and the charging liquid can also be suppressed as much as possible from being mixed with each other.

In the case in which the second valve 24 is formed of a check valve, when a charging liquid containing the discharge product is recovered, the charging liquid can be prevented from flowing backward into the battery case 11. As a result, the discharge product is not likely to stay in the battery case 11.

The first path 20 and the first valve 23 each may independently function as a portion of a device to charge the lithium air battery 1. When the opening portion 17 has a plug, the first path 20 and the first valve 23 may be omitted. However, the first valve 23 may be directly fitted to the opening portion 17.

The second path 21 and the second valve 24 each may independently function as a portion of a device to charge the lithium air battery 1. When the opening portion 18 has a plug, the second path 21 and the second valve 24 may be omitted. However, the second valve 24 may be directly fitted to the opening portion 18.

The opening portion 17 may be used for the supply and the emission of the charging liquid, and the opening portion 18 may be used for the emission and the supply of the electrolyte liquid.

When the opening portion 17 has two functions as a supply port and an emission port. The opening portion 18 may be omitted. That is, by the use of the opening portion 17, a sequence of processes including the emission of the electrolyte liquid, the supply of the charging liquid, the emission of the charging liquid, and the supply of the electrolyte liquid may also be performed.

Figure 2:
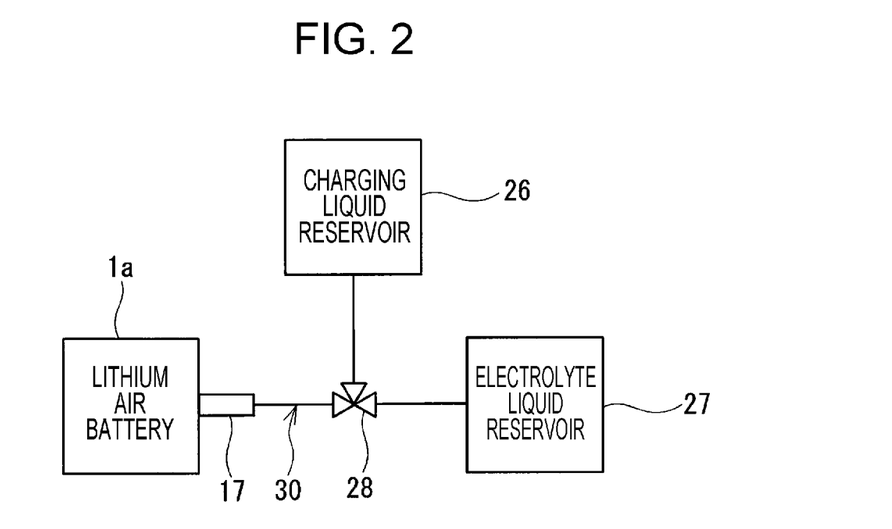
FIG. 2 is a structural view of an air battery according to a modified example.

FIG. 2 shows the structure of a lithium air battery 1a according to a modified example. The lithium air battery 1a has a single opening portion 17. Except for that the opening portion 18 is not provided, the structure of the lithium air battery 1a is the same as that of the lithium air battery 1 shown in FIG. 1. To the opening portion 17, a flow path 30 is coupled. The flow path 30 is, for example, detachable to the opening portion 17, that is, is coupled to the opening portion 17 when the lithium air battery 1a is charged and is detached from the opening portion 17 when the lithium air battery 1a is used. The flow path 30 is a flow path to couple a charging liquid reservoir 26 to the lithium air battery 1a or a flow path to couple an electrolyte liquid reservoir 27 to the lithium air battery 1a. The charging liquid reservoir 26 is a container to store the charging liquid. The electrolyte liquid reservoir 27 is a container to store the electrolyte liquid. A switching valve 28, such as a three-way valve, is provided for the flow path 30. By operating the switching valve 28, one of the charging liquid reservoir 26 and the electrolyte liquid reservoir 27 is selectively coupled to the lithium air battery 1a. The flow path 30 may be provided with a device, such as a pump, if needed. By operating the switching valve 28, a sequence of processes including the emission of the electrolyte liquid, the supply of the charging liquid, the emission of the charging liquid, and the supply of the electrolyte liquid may be performed.

Battery reactions in the lithium air battery 1 having the structure as described above are as follows.

Discharge reaction (that is, reaction when the lithium air battery 1 is used)

$$\text{negative electrode: } 2Li \rightarrow 2Li^+ + 2e^- \tag{A1}$$

$$\text{positive electrode: } 2Li^+ + 2e^- + O^{2-} \rightarrow 2Li_2O_2 \tag{A2}$$

Charge reaction (that is, reaction when the lithium air battery 1 is charged)

$$\text{negative electrode: } 2Li^+ + 2e^- \rightarrow 2Li \tag{A3}$$

$$\text{positive electrode: } Li_2O_2 \rightarrow 2Li^+ + 2e^- + O_2 \tag{A4}$$

In the discharge, as shown in the formulas (A1) and (A2), electrons and lithium ions are released from the negative electrode 12. At the same time when electrons are incorporated in the positive electrode 13, at the positive electrode 13, lithium ions and oxygen incorporated from the outside of the lithium air battery 1 react with each other to generate a lithium oxide. In the charge, as shown in the formulas (A3) and (A4), electrons and lithium ions are incorporated in the negative electrode 12. From the positive electrode 13, electrons, lithium ions, and oxygen are released.

Next, the constituent elements of the lithium air battery 1 as described above will be described in detail.

1. Positive Electrode

As described above, the positive electrode 13 contains the positive electrode layer 13a and may further contain the positive electrode collector 13b. Hereafter, the positive electrode layer 13a and the positive electrode collector 13b are respectively described.

(Positive Electrode Layer)

The positive electrode layer 13a contains a material which enables oxygen in air to be oxidized and reduced as a positive electrode active material. As the material described above, the positive electrode layer 13a of this embodiment contains an electrically conductive porous body containing carbon. A carbon material to be used as the electrically conductive porous body containing carbon may have a high electron conductivity. In particular, a carbon material, such as acetylene black or Ketjen black, which is generally used as an electrically conductive auxiliary agent may be used. In view of the specific surface area and the size of primary particles, an electrically conductive carbon black, such as Ketjen black, may be used. The carbon material is generally in the form of a powder. The specific surface area of the carbon material is, for example, 800 m$^2$/g or more and 2,000 m$^2$/g or less and may also be 1,200 m$^2$/g or more and 1,600 m$^2$/g or less. When the specific surface area of the carbon material is in the range described above, a positive electrode layer 13a having a porous structure is likely to be formed. The specific surface area is a value measured by a BET method.

The positive electrode layer 13a may further contain a binder which fixes the electrically conductive porous body described above. As the binder of the positive electrode layer 13a of the lithium air battery 1, a material known as the binder may be used. As the binder, for example, a vinylidene fluoride (PVdF) or a polytetrafluoroethylene (PTFE) may be mentioned. A content of the binder in the positive electrode layer 13a is not particularly limited and is, for example, in the range of 1 percent by mass or more and 40 percent by mass or less.

Since being changed, for example, in accordance with the application of the lithium air battery 1, a thickness of the positive electrode layer 13a is not particularly limited. The thickness of the positive electrode layer 13a is, for example, in the range of 2 µm or more and 500 µm or less and may also be in the range of 5 µm or more and 300 µm or less.

The positive electrode layer 13a may be formed, for example, by the following method. A carbon material and a solvent are mixed together to prepare a mixture. If needed, an additive, such as a binder, may also be contained in the mixture. The mixture thus obtained (to be used as a coating liquid) is applied on the positive electrode collector 13b by a coating method, such as a doctor blade method, and a coating film thus obtained is dried. Accordingly, the positive electrode 13 is obtained. A sheet-shaped positive electrode layer 13a having no positive electrode collector 13b may also be formed such that after the coating film of the mixture is dried, the coating film thus dried is rolled by a method, such as a roll press. The carbon material may also be directly molded by a compression press so as to form a sheet-shaped positive electrode layer 13a.

(Positive Electrode Collector)

The positive electrode collector 13b is a member to perform current collection from the positive electrode layer 13a. A material of the positive electrode collector 13b is not particularly limited as long as having an electrical conductivity. As the material of the positive electrode collector 13b, for example, stainless steel, nickel, aluminum, iron, titanium, or carbon may be mentioned. As the shape of the positive electrode collector 13b, for example, a foil shape, a plate shape, or a mesh (such as grid) shape may be mentioned. In this embodiment, the shape of the positive electrode collector 13b may be a mesh shape. The reason for this is that a mesh-shaped positive electrode collector 13b is excellent in current collection efficiency. In this case, in the positive electrode layer 13a, the mesh-shaped positive electrode collector 13b can be disposed. The lithium air battery 1 of this embodiment may further contain another positive electrode collector 13b (such as a foil-shaped collector) which collects charges collected by the mesh-shaped positive electrode collector 13b. In this embodiment, the battery case 11 which will be described later may also function as the positive electrode collector 13b. The thickness of the positive electrode collector 13b is, for example, in the range of 10 µm or more and 1,000 µm or less and may also be in the range of 20 µm or more and 400 µm or less.

2. Negative Electrode

As described above, the negative electrode 12 contains the negative electrode collector and may also further contain the negative electrode layer 12a. Hereinafter, the negative electrode layer 12a and the negative electrode collector will be respectively described.

(Negative Electrode Layer)

The negative electrode layer 12a of this embodiment may contain a negative electrode active material capable of occluding and releasing lithium ions. A material of the negative electrode active material as described above is not particularly limited as long as containing a lithium element, and for example, metal lithium which is a single metal, an alloy containing a lithium element, an oxide containing a lithium element, or a nitride containing a lithium element may be mentioned. As the alloy containing a lithium element, for example, there may be mentioned a lithium aluminum alloy, a lithium tin alloy, a lithium lead alloy, or a lithium silicon alloy. As the metal oxide containing a lithium element, for example, a lithium titanium oxide may be mentioned. As the metal nitride containing a lithium element, for example, lithium cobalt nitride, a lithium iron nitride, or a lithium manganese nitride may be mentioned.

The negative electrode layer 12a may contain only the negative electrode active material and may also contain a binder besides the negative electrode active material. When the negative electrode active material has a foil shape, the negative electrode layer 12a may contain only the negative electrode active material. When the negative electrode active material has a powder shape, the negative electrode layer 12a may contain the negative electrode active material and the binder. As the binder of the negative electrode layer 12a of the lithium air battery 1, a material known as the binder may be used, and for example, a PVdF or a PTFE may be mentioned. A content of the binder in the negative electrode layer 12a is not particularly limited and may be, for example, in the range of 1 percent by mass or more and 40 percent by mass or less. As a method to form the negative electrode layer 12a using a powdered negative electrode active material, as is the case of the method for forming the positive electrode layer 13a described above, a doctor blade method or a formation method by a compression press may be used.

(Negative Electrode Collector)

The negative electrode collector is a member to perform current collection from the negative electrode layer 12a. A material of the negative electrode collector is not particularly limited as long as having an electrical conductivity. As the material of the negative electrode collector of the lithium air battery 1, for example, a known material may be used. As the material of the negative electrode collector, for example, copper, stainless steel, nickel, or carbon may be mentioned. As the shape of the negative electrode collector, for example, a foil shape, a plate shape, or a mesh (such as grid) shape may be mentioned. The negative electrode collector may be a porous body having an irregular surface. The battery case 11 which will be described later may also function as the negative electrode collector.

3. Separator

The lithium air battery 1 of this embodiment may include a separator disposed between the positive electrode 13 and the negative electrode 12. Since the separator is disposed between the positive electrode 13 and the negative electrode 12, a highly safe battery can be obtained. The separator is not particularly limited as long as having a function to electrically separate the positive electrode layer 13a from the negative electrode layer 12a. As the separator, a porous insulating material may be used. As the porous insulating material, for example, a porous film, a resin-made non-woven cloth, a glass fiber-made non-woven cloth, or a paper-made non-woven cloth may be mentioned. As the porous film, for example, a polyethylene (PE) porous film or a polypropylene (PP) porous film may be mentioned. As the resin-made non-woven cloth, for example, a PE non-woven cloth or a PP non-woven cloth may be mentioned.

A porosity of the separator is, for example, in the range of 30% or more and 90% or less. When the porosity is in the range described above, a sufficient amount of the electrolyte is retained in the separator, and in addition, the separator has a sufficient strength. The porosity of the separator may also be in the range of 35% or more and 60% or less. The porosity is calculated from the true density, the total volume including the pores, and the weight of the material.

4. Electrolyte Layer

The electrolyte layer 14 is disposed between the negative electrode 12 and the positive electrode 13 and is a layer responsible for conduction of lithium ions. The electrolyte layer 14 is formed of a nonaqueous electrolyte and is provided between the negative electrode 12 and the positive electrode 13. The nonaqueous electrolyte is a lithium ion conductor having a lithium ion conductivity. The electrolyte layer 14 may be formed, for example, of a liquid electrolyte. The electrolyte layer 14 may be formed in combination of a liquid electrolyte and a solid electrolyte and may also be formed in combination of a liquid electrolyte and a gel electrolyte.

In one example, a nonaqueous electrolyte liquid prepared by dissolving a lithium salt in a nonaqueous solvent may be used as the electrolyte layer 14. The nonaqueous electrolyte liquid may be impregnated in the negative electrode 12 and/or in the positive electrode 13.

As the lithium salt dissolved in the nonaqueous electrolyte liquid, for example, lithium bis(trifluoromethanesulfonyl)imide ($LIN(SO_3CF_3)_2$), lithium perchlorate ($LiClO_4$), lithium hexafluorophosphate ($LiPF_6$), lithium tetrafluoroborate ($LiBF_4$), lithium trifluoromethanesulfonate ($LiCF_3SO_3$), or lithium bis(trifluoromethanesulfonyl)imide ($LiN(CF_3SO_2)_2$) may be mentioned but not limited thereto. As the electrolyte salt of the nonaqueous electrolyte liquid of the lithium air battery 1, a known lithium salt may be used.

A concentration of the electrolyte salt of the nonaqueous electrolyte liquid is, for example, 0.5 mol/litter or more and 2.5 mol/liter or less. When the nonaqueous electrolyte liquid is used as the electrolyte layer 14, the nonaqueous electrolyte liquid is impregnated and retained in the separator, so that the electrolyte layer 14 can be formed.

As the nonaqueous solvent, an ether may be used. Compared to a carbonate, the ether is not likely to cause a side reaction other than a redox reaction of oxygen in the positive electrode 13. In other words, the ether has an excellent oxygen radical resistance. Hence, the ether is suitably used as the solvent of the nonaqueous electrolyte liquid of the lithium air battery 1. When an ether having a sufficient resistance against oxygen radicals generated in a discharge reaction is used, a decomposed material of the electrolyte liquid can be suppressed from being deposited on the positive electrode 13 of the lithium air battery 1. Since an increase in resistance of the lithium air battery 1 can be suppressed, cycle characteristics of the lithium air battery 1 can also be improved.

The ether may be either a chain ether or a cyclic ether or may be a mixture thereof. Since being not likely to be vaporized and being particularly stable against oxygen radicals, the chain ether is suitable as the solvent of the nonaqueous electrolyte liquid of the lithium air battery 1. As the cyclic ether, for example, 2-methyltetrahydrofuran or tetrahydrofuran may be mentioned. As the chain ether, for example, a dialkyl ether, a symmetric glycol diether, or an asymmetric glycol diether may be mentioned. As the dialkyl ether, for example, dibutyl ether may be mentioned. The symmetric glycol diether may also be called a glyme. As the glyme, for example, monoglyme, diglyme, triglyme, tetraglyme, pentaglyme, or hexaglyme may be mentioned. In the nonaqueous electrolyte liquid, as the nonaqueous solvent, the ether may only be contained.

The glyme has an excellent oxygen radical resistance. Since the glyme is used as the solvent, the decomposition of the nonaqueous electrolyte liquid can be not only suppressed, but the increase in resistance of the lithium air battery 1 can also be suppressed. In the nonaqueous electrolyte liquid, as the nonaqueous solvent, the glyme may only be contained.

The glyme may be at least one selected from the group consisting of triglyme and tetraglyme. Triglyme and tetraglyme each have both a low volatility and a low viscosity. Since triglyme and/or tetraglyme is used as the solvent of the electrolyte liquid, while liquid shortage of the lithium air battery 1 is prevented, transport of lithium ions and oxygen can be smoothly performed, and the discharge capacity can be increased. In terms of the prevention of liquid shortage, tetraglyme is superior to triglyme. In terms of the transport of lithium ions and oxygen, triglyme is superior to tetraglyme.

As other nonaqueous solvents which can be used for the nonaqueous electrolyte liquid, dimethylsulfoxide may be mentioned. The other nonaqueous solvents may include an ionic liquid, such as N-methyl-N-propylpiperidinium bis(trifluoromethanesulfonyl)imide.

5. Battery Case

As long as capable of receiving the positive electrode 13, the negative electrode 12, and the electrolyte layer 14 as described above, the battery case 11 of the lithium air battery 1 of this embodiment is not particularly limited in terms of the shape and the like. The shape of the battery case 11 of the lithium air battery 1 of this embodiment is not limited to that shown in FIG. 1, and various shapes, such as a coin shape, a flat plate shape, a cylindrical shape, and a laminate shape, may be used. The battery case 11 may be either an air open type battery case or an airtight type battery case. The air open type battery case has a ventilation hole through which air flows in and out and is a case in which air can be in contact with the positive electrode. In the case of the airtight type battery case, the airtight type battery case may be provided with a supply tube and an emission tube for a gas. In this case, the gas to be supplied and emitted may be a dry gas. The gas to be supplied and emitted may have a high oxygen concentration or may also be pure oxygen (oxygen concentration: 99.99%). In the discharge, the oxygen concentration may be high, and in the charge, the oxygen concentration may be low.

Next, a method for using the lithium air battery 1 will be described.

Figure 3:
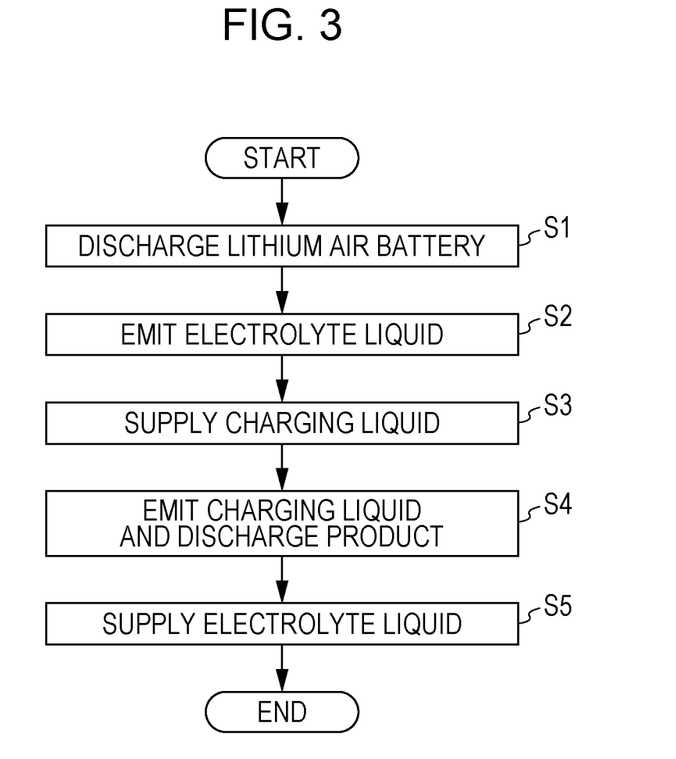
FIG. 3 is a flowchart showing a method for using the air battery of the present disclosure.

FIG. 3 is a flowchart showing a method for using the lithium air battery 1. As shown in FIG. 3, in Step S1, the lithium air battery 1 is coupled to a load and is discharged. Step S1 corresponds to a general use of the lithium air battery 1.

After the lithium air battery 1 is discharged and before the charging liquid is supplied, in Step S2, the second valve 24 is opened, and the electrolyte (liquid electrolyte) is emitted from the inside to the outside of the lithium air battery 1 through the opening portion 18 and the second path 21. Accordingly, a space to fill the charging liquid can be secured, and in addition, the charging liquid can be surely brought into contact with the discharge product precipitated on the positive electrode 13. In the lithium air battery 1, the discharge product precipitated on the positive electrode 13 is lithium peroxide.

Subsequently, in Step S3, the second valve 24 is closed, the first valve 23 is opened, and the charging liquid is supplied from the outside to the inside of the lithium air battery 1 through the opening portion 17 and the first path 20. When the first valve 23 is a check valve, the open/close operation of the first valve 23 is omitted. By the function of the charging liquid, the discharge product is desorbed from the positive electrode 13. While the charging liquid is filled in the lithium air battery 1, the battery is left for a predetermined time. The predetermined time is a time necessary to desorb the discharge product from the positive electrode 13 and is, for example, several seconds to one hour. This time is significantly shorter than a time necessary to decompose lithium peroxide using a redox mediator.

When the charging liquid is brought into contact with the discharge product precipitated on the positive electrode 13, the discharge product is desorbed from the positive electrode 13 while being in the form of a solid. The discharge product thus desorbed is emitted to the outside of the lithium air battery 1 together with the charging liquid. According to this embodiment, since the discharge product is not required to be fully decomposed, compared to the charge which electrochemically decomposes lithium peroxide, the charge can be completed in a significantly short time. Since no current is required to flow through the positive electrode 13, degradation of the positive electrode 13 and production of by-products, such as lithium carbonate, can also be suppressed.

The process in Step S2 may be performed before the charging liquid is supplied to the inside of the lithium air battery 1 (in particular, to the inside of the battery case 11) or may be performed in parallel with the process in Step S3. That is, the first valve 23 and the second valve 24 are opened, and while the charging liquid is supplied to the inside of the lithium air battery 1, the electrolyte liquid may be pushed to the outside of the lithium air battery 1 by a pressure of the charging liquid.

Subsequently, in Step S4, the first valve 23 is closed, and the second valve 24 is opened, so that the solid-state discharge product desorbed from the positive electrode 13 is emitted to the outside of the lithium air battery 1 together with the charging liquid. Accordingly, the discharge product is removed from the positive electrode 13, and the porous structure of the positive electrode 13 is reproduced.

Next, After the discharge product and the charging liquid are emitted, in Step S5, an electrolyte is supplied to the inside of the lithium air battery 1. The first valve 23 and the second valve 24 are closed. Accordingly, the charge of the lithium air battery 1 is completed, and the lithium air battery 1 can be again discharged.

According to this embodiment, the discharge product precipitated on the positive electrode 13 is removed from the positive electrode by desorption. Hence, a lithium air battery 1 which can be charged in a short time and, in addition, which can stably supply electric energy for a long time can be provided. In addition, a change of the positive electrode 13 is also not required.

The electrolyte emitted to the outside of the lithium air battery 1 in Step S2 may be returned to the inside of the lithium air battery 1 in Step S5. Accordingly, the electrolyte liquid may be repetitively used, and a lithium air battery 1 capable of stably supplying electric energy for a long time can be realized.

The charging liquid emitted to the outside of the lithium air battery 1 in Step S4 may also be reused. Since the charging liquid is reused, a lithium air battery 1 capable of stably supplying electric energy for a long time can be realized.

Next, the composition of the charging liquid will be described.

The charging liquid has at least one of a function to decompose the discharge product by a reaction therewith, a function to dissolve the discharge product, or a function to disperse the discharge product in the charging liquid by an interaction with the discharge product.

As the charging liquid having a function to dissolve the discharge product, an organic solution containing an anion receptor may be mentioned. For example, an anion receptor, such as tripropyl borate, tris(pentafluorophenyl)borane, or tris(pentafluorophenyl)phosphine, dissolves the discharge product.

As the charging liquid having a function to disperse the discharge product in the charging liquid by an interaction with the discharge product, a charging liquid containing a compound, such as a fluoride of a phosphate ester, a partial fluoride of a phosphate ester, a fluoride of a borate ester, or a partial fluoride of a borate ester, may be mentioned. According to those compounds, the discharge product precipitated on the positive electrode 13 can be desorbed from the positive electrode 13 without decomposing the discharge product. That is, the lithium air battery 1 can be charged in a short time.

In particular, the charging liquid may contain at least one selected from the group consisting of a compound represented by the following formula (1), a compound represented by the following formula (2), and a compound represented by the following formula (3). The compound represented by the formula (1), the formula (2), or the formula (3) has a function to disperse the discharge product in the charging liquid by an interaction with the discharge product. Hence, according to the charging liquid containing at least one of those compounds, the discharge product precipitated on the positive electrode 13 can be rapidly desorbed from the positive electrode 13. That is, the lithium air battery 1 can be charged in a short time.

In the formula (1), the formula (2), and the formula (3), $R_1$, $R_2$, and $R_3$ each independently represent a fluorinated alkyl group having 1 to 5 carbon atoms.

As at least one selected from the group consisting of the compound represented by the following formula (1), the compound represented by the following formula (2), and the compound represented by the following formula (3), the charging liquid contains at least one selected from the group consisting of tris(2,2,2-trifluoroethyl)phosphite (TFEPi), tris(2,2,2-trifluoroethyl)phosphate (TFEPa), tris(1,1,1,3,3,3-hexafluoro-2-propyl)phosphite (TFPP), tris(2,2,2-trifluoroethyl)borate (TFEB), and tris(hexafluoroisopropyl)borate (TFPB).

Those compounds are compounds in which the numbers of carbon atoms or $R_1$, $R_2$, and $R_3$ in the formula (1), the formula (2), and the formula (3) are each three or less. In this case, a steric hindrance around the center atom (the phosphorus atom or the boron atom) which is a portion interacting with the discharge product is not excessively high. Since having an appropriate number of carbon atoms, those compounds each have a sufficient function as a surfactant between the discharge product and a liquid (solvent of the charging liquid). Hence, according to the charging liquid containing at least one of those compounds, the discharge product precipitated on the positive electrode 13 can be desorbed from the positive electrode 13 in a shorter time. That is, the lithium air battery 1 can be charged in a shorter timer.

As the liquid having a function to decompose the discharge product by a reaction therewith, an organic solution containing a redox mediator may be mentioned. The redox mediator is changed into a cationic body by oxidation thereof, and lithium peroxide which is the discharge product is decomposed.

As the redox mediator, for example, there may be mentioned tetrathiafulvalene, ferrocene, 2,2,6,6-tetramethylpiperidine-1-oxyl, 2-azaadamantane-N-oxyl, 9-azanoradamantane-N-oxyl, 1,5-dimethyl-9-azanoradamantane-N-oxyl, 9-azabicyclo[3.3.1]nonane-N-oxyl, 4-acetamide-2,2,6,6-tetramethylpiperidine-1-oxyl, lithium iodide, lithium bromide, 10-methylphenotiazine, N, N, N, N-tetramethyl-p-phenylenediamine, 5,10-dihydro-5,10-dimethylphenazine, tris [4-(diethylamino)phenyl]amine, or iron phthalocyanine. At least one of those compounds may be used as the redox mediator.

A concentration of the redox mediator in the charging liquid is, for example, 0.01 mmol/liter or more and 500 mmol/liter or less.

The charging liquid contains an organic solvent. As the organic solvent, the same organic solvent as that used for the electrolyte layer 14 of the lithium air battery 1 may be used. For example, when a glyme is used for the electrolyte liquid forming the electrolyte layer 14 of the lithium air battery 1, the same type of glyme may be used as the solvent of the charging liquid. Accordingly, influences of the charging liquid on the characteristics of the lithium air battery 1 can be reduced.

The at least one compound selected from the group consisting of the compound represented by the formula (1), the compound represented by the formula (2), and the compound represented by the formula (3) is contained in the charging liquid, for example, in the range of 0.1 percent by weight or more and 100 percent by weight or less.

In this embodiment, the negative electrode 12 contains a negative electrode active material capable of occluding and releasing lithium ions. The electrolyte contains a lithium ion conductor. When the technique of the present disclosure is applied to the lithium air battery 1, a secondary battery having a larger capacity can be provided. Even if the compound represented by the formula (1), (2), or (3) is mixed in the electrolyte liquid, the occlusion of lithium in the negative electrode 12, the release of lithium in the negative electrode 12, and the lithium ion conduction of the electrolyte are not disturbed.

The charging liquid is able to disperse lithium peroxide in the electrolyte liquid by an interaction with oxygen atoms incorporated in lithium peroxide. Hence, the same effect as described above can be expected to be obtained by an air battery using a metal other than lithium.

EXAMPLES

Hereinafter, the present disclosure will be described in more detail with reference to examples. The following examples are described by way of example, and the present disclosure is not limited to the following examples.

(Formation of Lithium Air Battery)

As a carbon material, a Ketjen black powder (manufactured by Lion Corporation) was used. As a binder, a PTFE powder (manufactured by Daikin Industries, Ltd.) was used. The carbon material and the binder were mixed together at a mass ratio of 90:10 using an ethanol solvent, so that a mixture was obtained. The mixture was rolled by a roll press, so that an electrode sheet was formed. The electrode sheet thus obtained was cut, so that a positive electrode (positive electrode layer) was obtained.

LiN(SO$_3$CF$_3$)$_2$ (manufactured by Kishida Chemical Co., Ltd.) was dissolved in tetraglyme (manufactured by Kishida Chemical Co., Ltd.) to have a concentration of 1 mol/liter, so that a nonaqueous electrolyte liquid was obtained.

As a separator, a glass fiber-made separator was prepared. A SUS304 mesh (manufactured by The Nilaco Corporation) functioning as a collector was adhered to metal lithium foil (manufactured by The Honjo Chemical Corporation), so that a negative electrode was obtained. By using the positive electrode, the separator, the nonaqueous electrolyte liquid, and the negative electrode, a lithium air battery having the structure as shown in FIG. 1 was formed.

(Sample 1)

In an oxygen atmosphere, a discharge test of the lithium air battery thus formed was performed. A current density in the discharge was 0.4 mA/cm$^2$, and a cut-off voltage was 2.0 V.

After the discharge, the positive electrode was recovered from the battery case and was then immersed for 30 minutes in a tetraglyme solution (charging liquid) containing TFEB at a concentration of 10 percent by weight. Subsequently, the positive electrode was washed with ethyl methyl carbonate to remove the charging liquid, and by an inductively coupled plasma atomic emission spectroscopy (ICP-AES), an amount of lithium remaining on the positive electrode was quantitatively measured. All the amount of lithium thus detected was assumed to be derived only from the discharge product (lithium peroxide), and the rate of lithium peroxide remaining on the positive electrode after the immersion in the charging liquid was calculated. The result is shown in Table 1. The rate of lithium peroxide remaining on the positive electrode was calculated based on the discharge capacity.

(Sample 2)

Except for that an immersion liquid (charging liquid) contained no TFEB, by the same method as that of Sample 1, the positive electrode was immersed in the charging liquid, and the rate of lithium peroxide remaining on the positive electrode was then measured.

Table 1

| | IMMERSION LIQUID (CHARGING LIQUID) | RATE OF LITHIUM PEROXIDE REMAINING ON POSITIVE ELECTRODE |
|---|---|---|
| SAMPLE 1 | 10 wt % TFEB/ TETRAGLYME | 0% |
| SAMPLE 2 | TETRAGLYME | 97% |

As shown in Table 1, since the tetraglyme solution (charging liquid) containing TFEB was brought into contact with the positive electrode, lithium peroxide could be substantially fully desorbed from the positive electrode. This result indicates that, by the method of the present disclosure, the charge can be performed in a short time.

Figure 4:
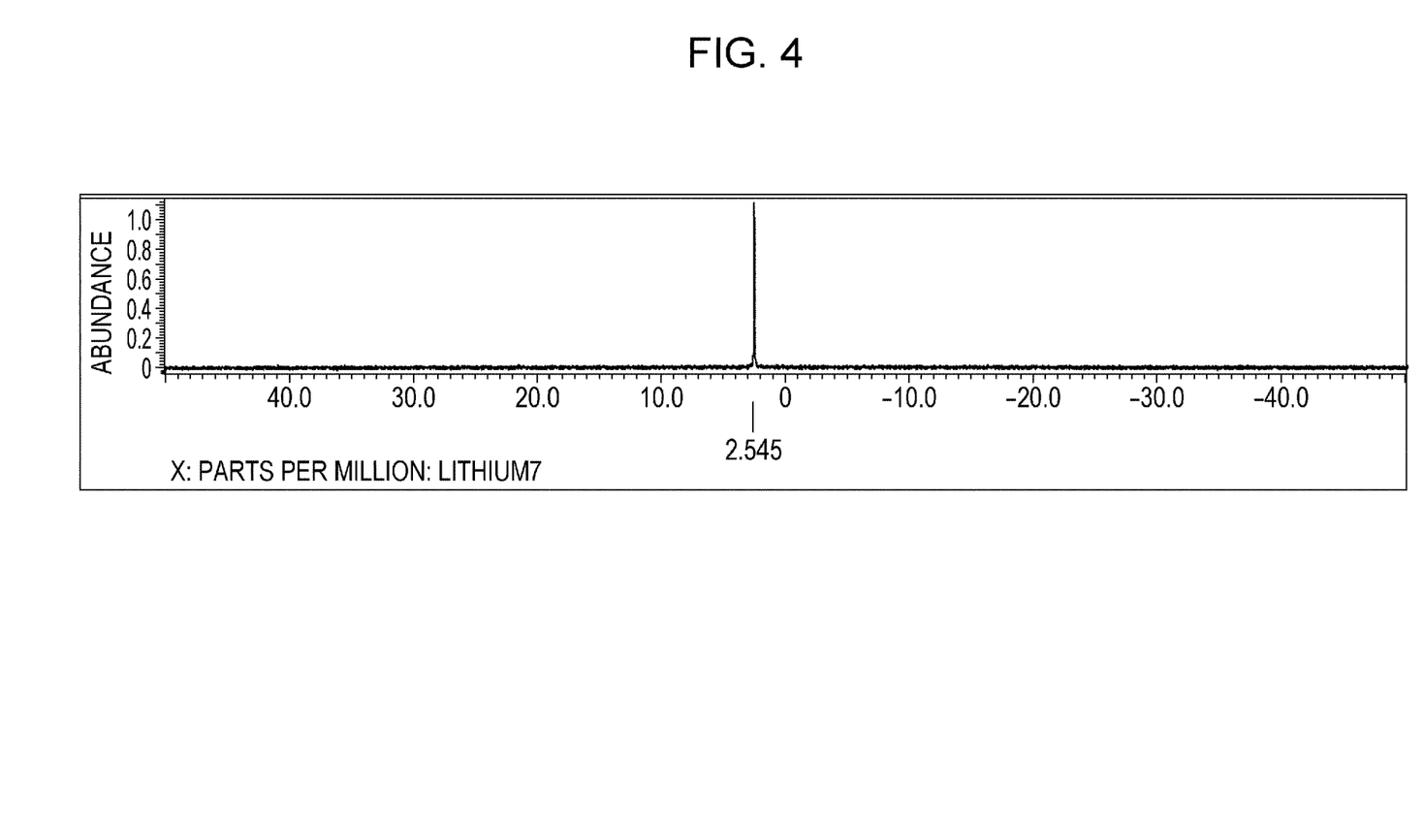
FIG. 4 is a $^7Li$-NMR spectrum of a charging liquid used in Sample 1.

FIG. 4 shows a $^7$Li-NMR spectrum of the charging liquid used in Sample 1. A peak at approximately 2.5 ppm is a peak corresponding to Li$^+$ of lithium peroxide dissolved in the charging liquid. A calibration curve of Li$^+$ was formed using a LiCl aqueous solution, and from a peak intensity of FIG. 4, the lithium peroxide dissolved in the charging liquid was quantitatively measured. The rate of lithium peroxide dissolved in the charging liquid was low, such as 0.5 percent by mole of the discharge capacity. The result described above indicates that almost all the lithium peroxide was not dissolved in the charging liquid, and almost all the lithium peroxide precipitated by the discharge was peeled away in the form of a solid from the positive electrode and was transferred in the charging liquid.

On the other hand, in Sample 2, the rate of lithium peroxide remaining on the positive electrode was 97%.

(Sample 3)

In an oxygen atmosphere, a 1$^{st}$-cycle discharge test of the lithium air battery thus formed was performed. A current density in the discharge was 0.4 mA/cm$^2$, and a cut-off voltage was 2.0 V.

After the discharge, the electrolyte liquid of the lithium air battery was changed to a charging liquid, and the positive electrode was brought into contact with the charging liquid. As the charging liquid, a tetraglyme solution containing TFEPa or TFEB at a concentration of 10 percent by weight was used. Subsequently, the charging liquid was emitted to the outside of the lithium air battery, and the electrolyte liquid described above was again returned to the inside of the lithium air battery, and a 2$^{nd}$-cycle discharge test was performed. A current density in the discharge was 0.4 mA/cm$^2$, and a cut-off voltage was 2.0 V. A discharge capacity at the second cycle to the discharge capacity at the first cycle (capacity retention rate) was calculated. The results are shown in Table 2.

(Sample 4)

Except for that tetraglyme was used as the immersion liquid (charging liquid), by the same method as that of Sample 3, the capacity retention rate was measured.

(Sample 5)

The charge using the charging liquid was not performed, charge by a current flowing between the positive electrode and the negative electrode was performed. That is, lithium peroxide was electrochemically decomposed. A current density in the charge was 0.1 mA/cm$^2$, and a cut-off voltage was 4.5 V. Subsequently, a 2$^{nd}$-cycle discharge test was performed, and the capacity retention rate was measured.

TABLE 2

| | IMMERSION LIQUID (CHARGING LIQUID) | CAPACITY RETENTION RATE AT SECOND CYCLE |
|---|---|---|
| SAMPLE 3 | 10 wt % TFEPa/ TETRAGLYME | 100% |
| SAMPLE 4 | 10 wt % TFEB/TETRAGLYME TETRAGLYME | 100% 3% |
| SAMPLE 5 | NONE (CHARGE BY FLOWING CURRENT) | 67% |

As shown in Table 2, in Sample 3, the same discharge capacity as that obtained at the first cycle was also obtained at the second cycle. In Sample 3, no current was allowed to flow in the charge. Hence, it is believed that although all the lithium peroxide was removed, oxidation degradation was not generated on the surface of the positive electrode, and excellent charge/discharge cycle characteristics were obtained.

On the other hand, the capacity retention rate of Sample 4 in which only tetraglyme was used as the charging liquid was low. That is, in Sample 4, almost all the lithium peroxide was not removed. That is, the charge was hardly performed. The capacity retention rate of Sample 5 was significantly lower than the capacity retention rate of Sample 3.

According to the technique of the present disclosure, the charge time of the air battery can be shortened. The air battery of the present disclosure is useful as a secondary battery.

What is claimed is:

1. A charge/discharge method of an air battery including a positive electrode, a negative electrode, and a nonaqueous electrolyte liquid containing a nonaqueous solvent and a lithium salt dissolved in the nonaqueous solvent, the nonaqueous electrolyte liquid being interposed between the positive electrode and the negative electrode, the method comprising:
 discharging the air battery while generating a discharge product on the positive electrode;
 supplying a charging liquid different from the nonaqueous electrolyte liquid from the outside to the inside of the air battery; and leaving the air battery for a predetermined time to desorb the discharge product in a solid state from the positive electrode without an electrochemical reaction.

2. The charge/discharge method according to claim 1, further comprising:
emitting the nonaqueous electrolyte liquid from the inside to the outside of the air battery after the discharging and before the supplying.

3. The charge/discharge method according to claim 2, further comprising:
emitting the discharge product desorbed from the positive electrode together with the charging liquid to the outside of the air battery after the leaving; and
returning the nonaqueous electrolyte liquid from the outside to the inside of the air battery after the emitting of the discharge product.

4. The charge/discharge method according to claim 1, further comprising:
emitting the nonaqueous electrolyte liquid from the inside to the outside of the air battery after the discharging and in parallel with the supplying.

5. The charge/discharge method according to claim 4, further comprising:
emitting the discharge product desorbed from the positive electrode together with the charging liquid to the outside of the air battery after the leaving; and
returning the nonaqueous electrolyte liquid from the outside to the inside of the air battery after the emitting of the discharge product.

6. The charge/discharge method according to claim 1, further comprising:
emitting the discharge product desorbed from the positive electrode together with the charging liquid to the outside of the air battery after the leaving.

7. The charge/discharge method according to claim 6, further comprising:
supplying an electrolyte liquid to the inside of the air battery after the emitting.

8. The charge/discharge method according to claim 6, wherein
no electric current flows through the positive electrode after the supplying of the charging liquid and before the emitting of the charging liquid.

9. The charge/discharge method according to claim 1, wherein the charging liquid contains at least one selected from the group consisting of a compound represented by the following formula (1), a compound represented by the following formula (2), and a compound represented by the following formula (3):

(1)

(2)

(3)

10. The charge/discharge method according to claim 9, wherein as the at least one selected from the group consisting of the compound represented by the formula (1), the compound represented by the formula (2), and the compound represented by the formula (3), the charging liquid contains at least one selected from the group consisting of tris(2,2,2-trifluoroethyl)phosphite, tris(2,2,2-trifluoroethyl)phosphate, tris(1,1,1,3,3,3-hexafluoro-2-propyl)phosphite, tris(2,2,2-trifluoroethyl)borate, and tris(hexafluoroisopropyl)borate.

* * * * *